(12) United States Patent
Elliott

(10) Patent No.: US 10,681,915 B2
(45) Date of Patent: Jun. 16, 2020

(54) BAKING PAN ASSEMBLY

(71) Applicant: Tony L. Elliott, Villa Rica, GA (US)

(72) Inventor: Tony L. Elliott, Villa Rica, GA (US)

(*) Notice: Subject to any disclaimer, the term of this patent is extended or adjusted under 35 U.S.C. 154(b) by 308 days.

(21) Appl. No.: 15/631,399

(22) Filed: Jun. 23, 2017

(65) Prior Publication Data

US 2018/0116456 A1    May 3, 2018

Related U.S. Application Data

(60) Provisional application No. 62/415,303, filed on Oct. 31, 2016.

(51) Int. Cl.
   *A21B 1/00*     (2006.01)
   *A47J 37/01*    (2006.01)

(52) U.S. Cl.
   CPC ............... *A21B 1/00* (2013.01); *A47J 37/01* (2013.01)

(58) Field of Classification Search
   CPC ............. A21B 1/00; A21B 6/00; A47J 37/01
   USPC ................................. 99/425, 426, 444, 448
   See application file for complete search history.

(56) References Cited

U.S. PATENT DOCUMENTS

| | | | | |
|---|---|---|---|---|
| 2,081,078 A | * | 5/1937 | Watson | A21B 3/13 |
| | | | | 126/373.1 |
| 2,257,536 A | * | 9/1941 | Roycroft | A47F 10/06 |
| | | | | 211/126.1 |
| 2,788,912 A | * | 4/1957 | Simonsen | B65D 25/06 |
| | | | | 220/533 |
| 6,463,844 B1 | * | 10/2002 | Wang | A21B 3/13 |
| | | | | 99/400 |
| 9,468,216 B2 | * | 10/2016 | Parth | A21B 3/134 |

* cited by examiner

*Primary Examiner* — Tu B Hoang
*Assistant Examiner* — Thomas J Ward
(74) *Attorney, Agent, or Firm* — Alston & Bird LLP

(57) ABSTRACT

A baking pan assembly includes a baking pan including a bottom, a pair of opposing end walls extending upward from the bottom in a vertical direction, and a pair of opposing side walls extending upward from the bottom in the vertical direction, where each of the opposing side walls define an engagement portion having a retaining slot extending downward into the engagement portions and an insert configured to be inserted within the retaining slots of the baking pan.

12 Claims, 13 Drawing Sheets

BAKING PAN ASSEMBLY

CROSS-REFERENCE TO RELATED APPLICATIONS

This application claims priority to and the benefit of U.S. Provisional Patent Application 62/415,303, filed Oct. 31, 2016, the contents of which are hereby incorporated by reference.

BACKGROUND

Baking pans may be used in the cooking of various foods, for example, uncooked and/or unheated food may be positioned within a baking pan, and the baking pan may be positioned within an oven or other heating element to cook and/or heat the food. Conventional baking pans may include a variety of shapes and sizes that are configured to be used in the preparation of different types and quantities of food. However, the size and shape of a particular baking pan may limit the versatility of the pan, such that conventional baking pans may be limited to cooking certain types and quantities of foods. For example, relatively large baking pans may be unsuitable for cooking smaller servings of food, and smaller baking pans may be unsuitable for cooking larger servings of food.

As a result, users wishing to cook a variety of different types and quantities of foods may be required to purchase multiple baking pans. Further, it may be difficult to store and keep multiple baking pans when storage area is limited, such as in smaller kitchens or food preparation areas.

Accordingly, a need exists for alternative baking pans that may be configured to prepare different types and quantities of food.

BRIEF SUMMARY

In one embodiment, a baking pan assembly includes a baking pan including a bottom, a pair of opposing end walls extending upward from the bottom in a vertical direction, and a pair of opposing side walls extending upward from the bottom in the vertical direction, where each of the opposing side walls define an engagement portion having a retaining slot extending downward into the engagement portions and an insert configured to be inserted within the retaining slots of the baking pan.

In another embodiment, a baking pan assembly includes a baking pan including a bottom that defines a medial trench extending downward into the baking pan and extending across the baking pan in a lateral direction, a pair of opposing end walls extending upward from the bottom in a vertical direction, and a pair of opposing side walls extending upward from the bottom in the vertical direction, and an insert configured to be inserted within the medial trench of the baking pan.

BRIEF DESCRIPTION OF THE SEVERAL VIEWS OF THE DRAWINGS

Figure 1:
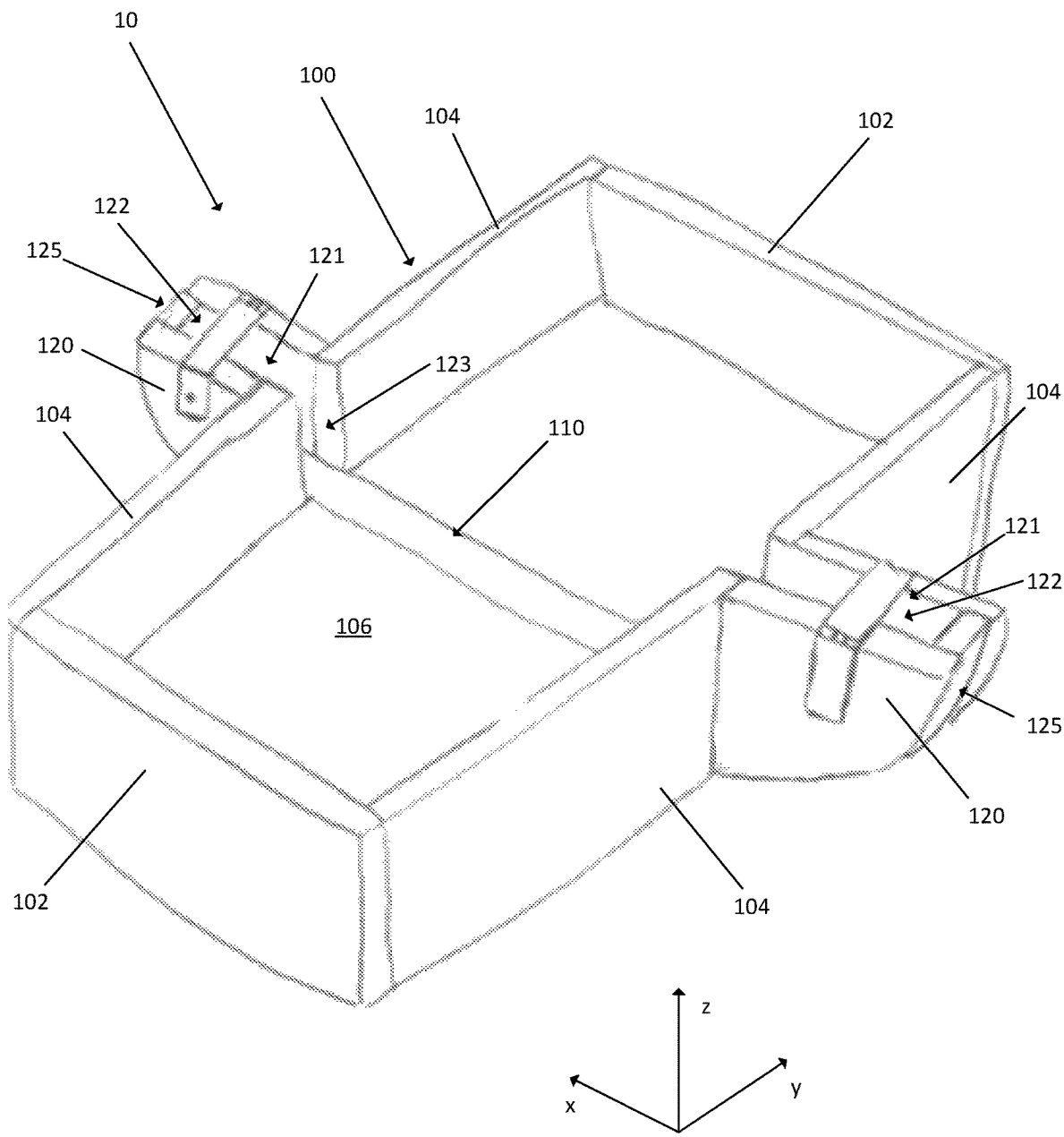
Figure 2:
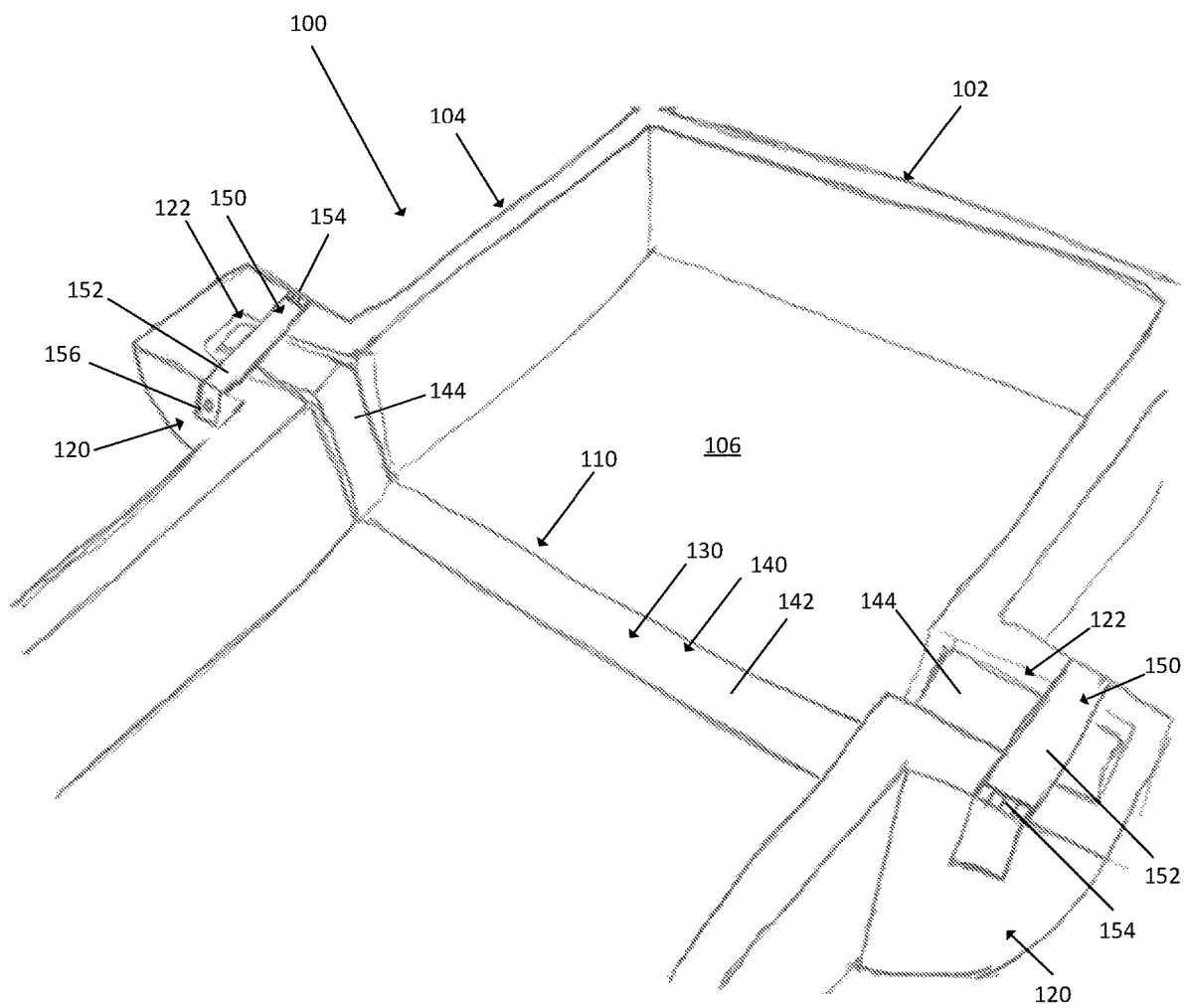
Figure 2:
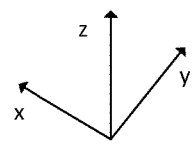
Figure 3:
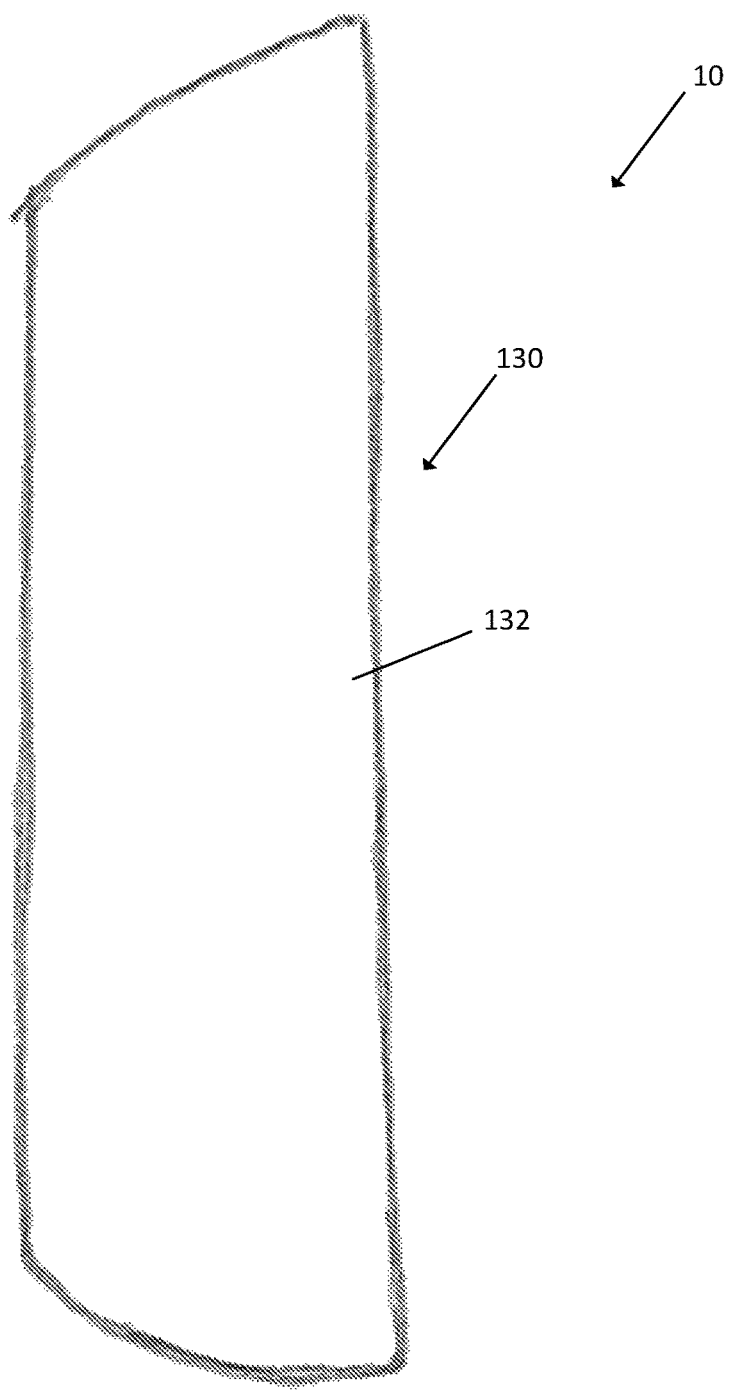
Figure 4:
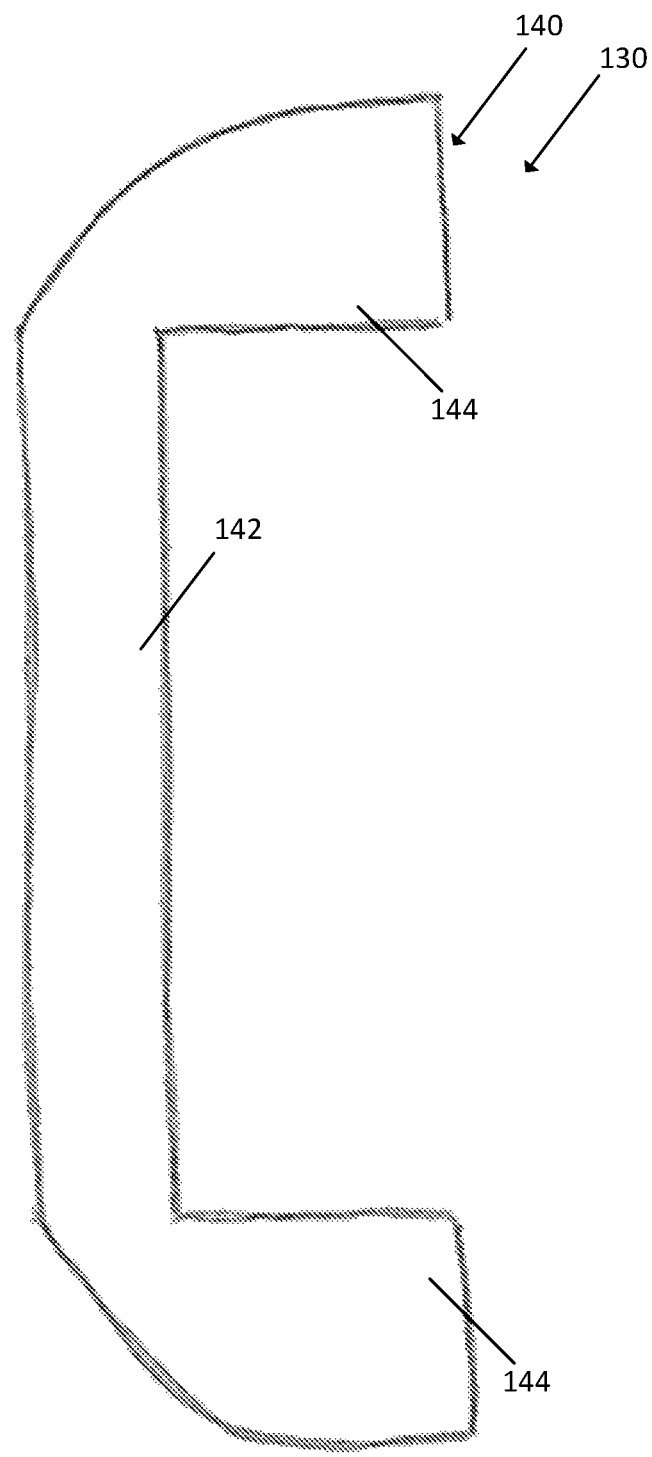
Figure 5:
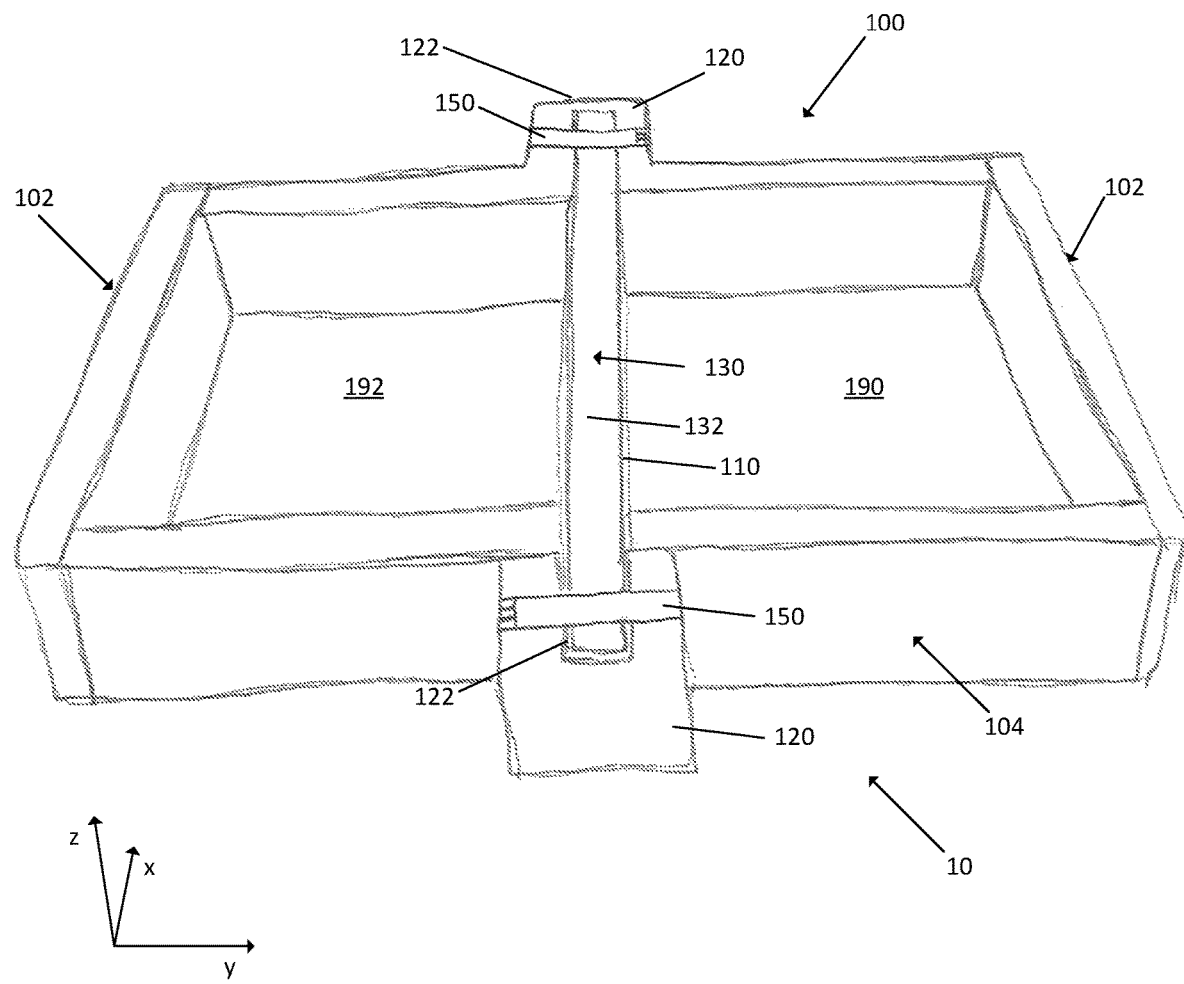
Figure 6:
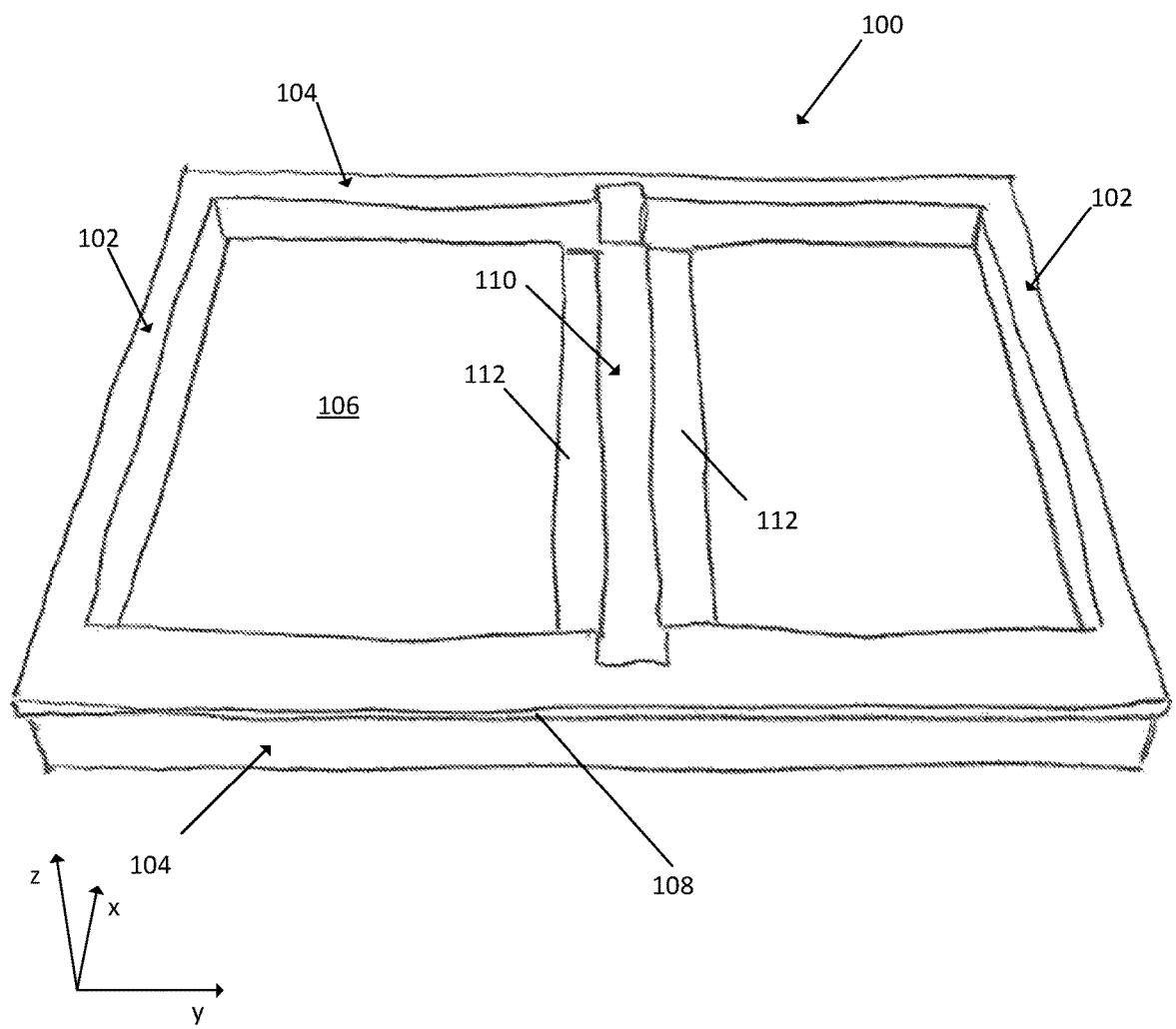
Figure 7:
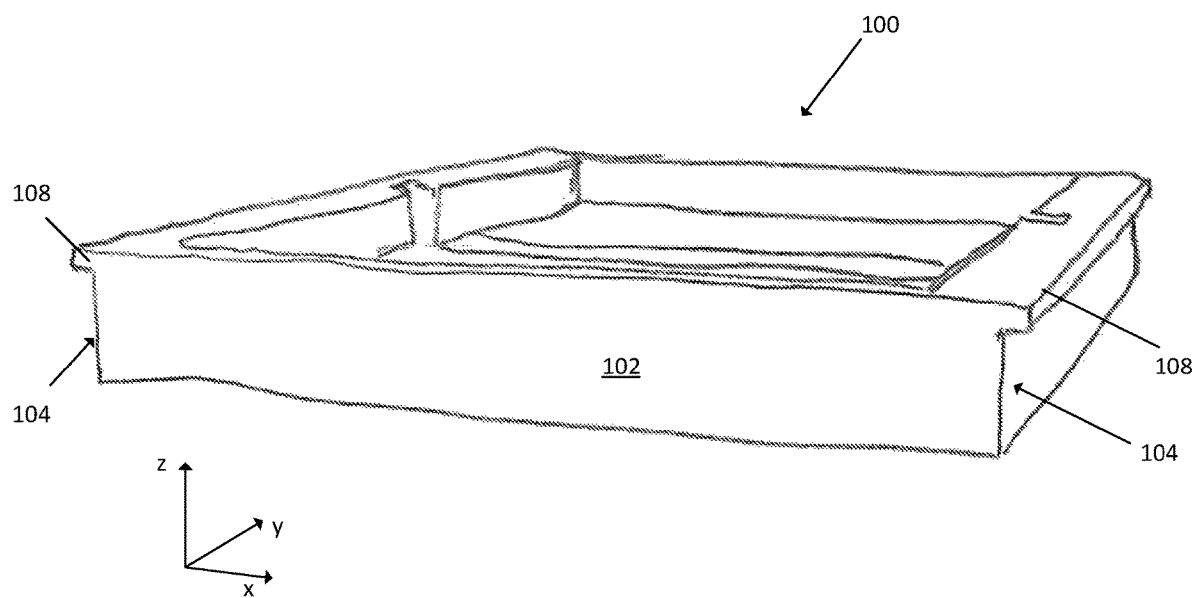
Figure 8:
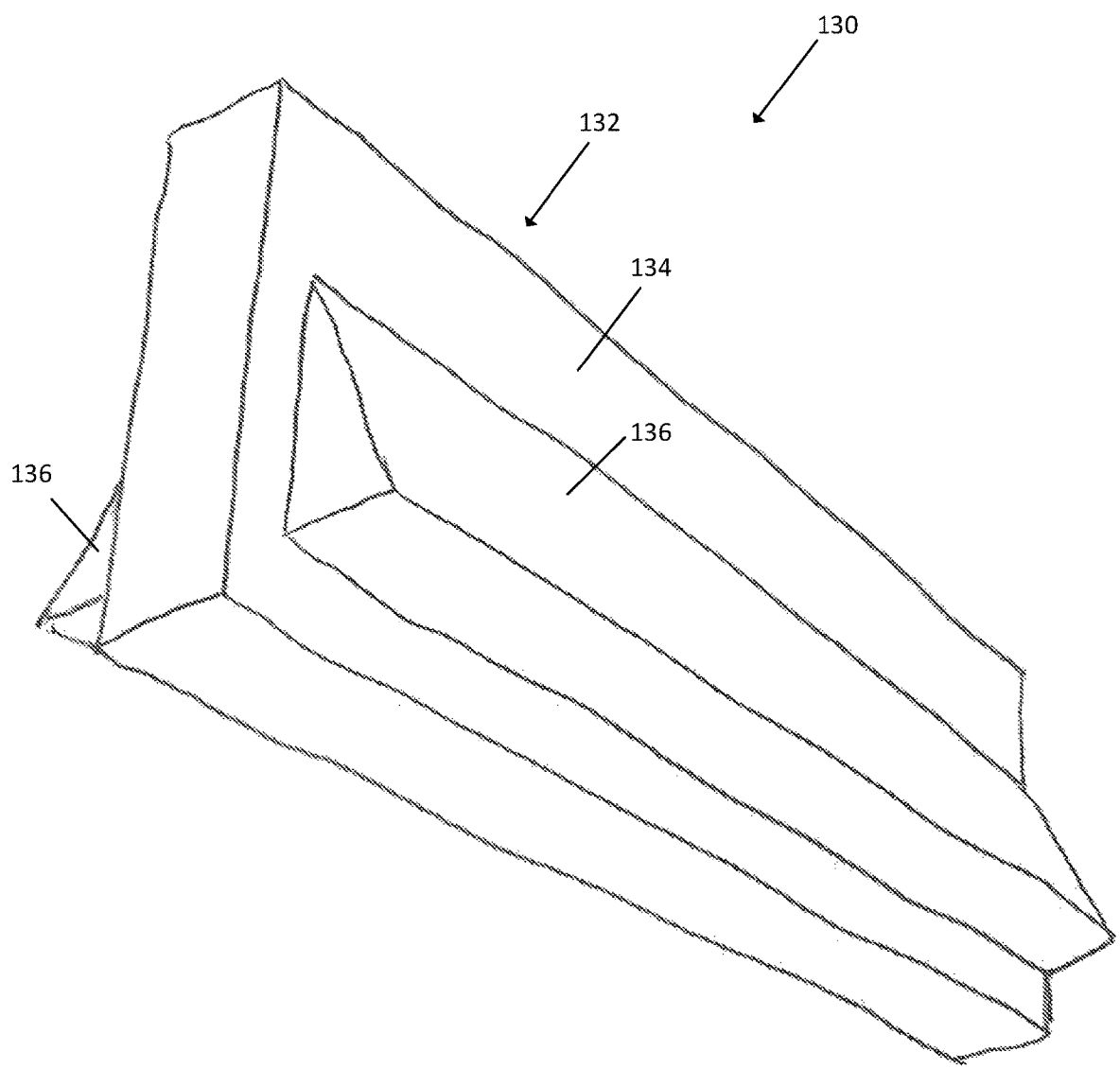
Figure 9:
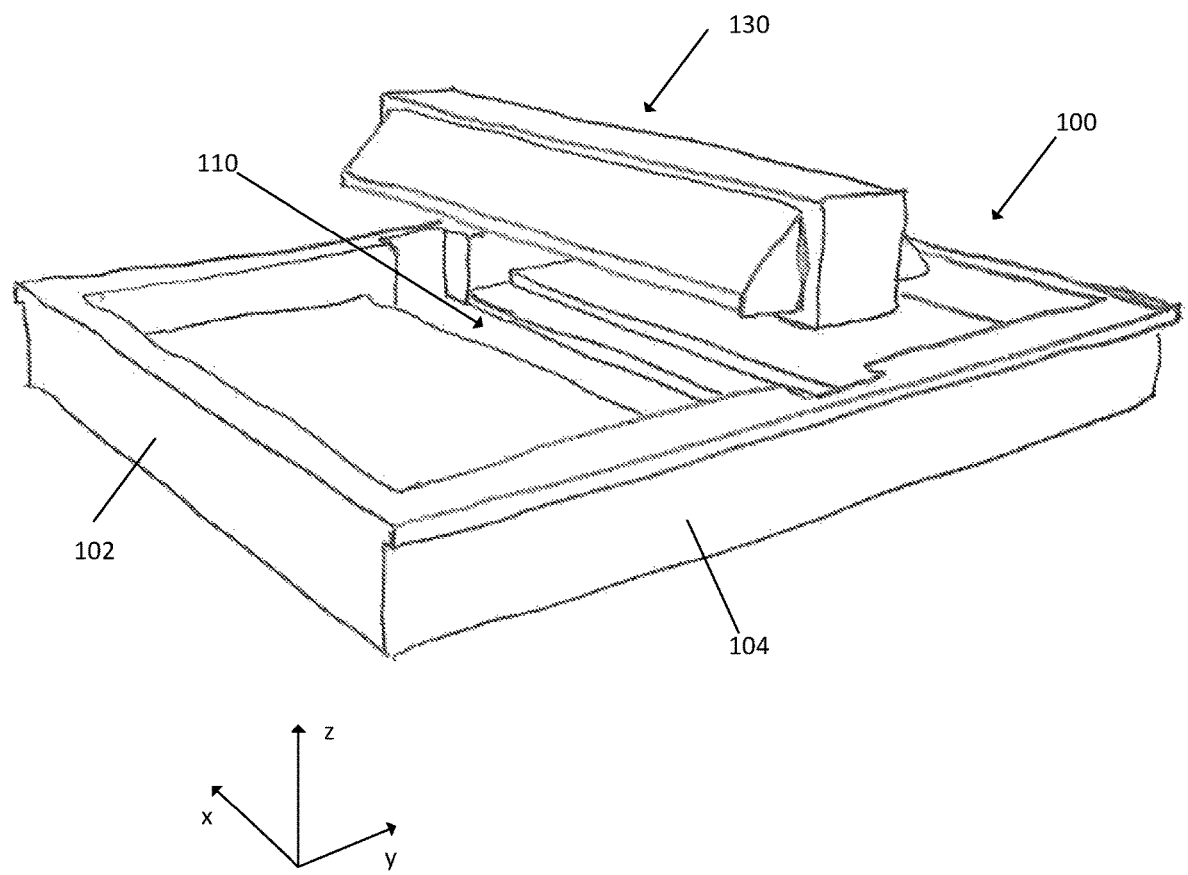
Figure 10:
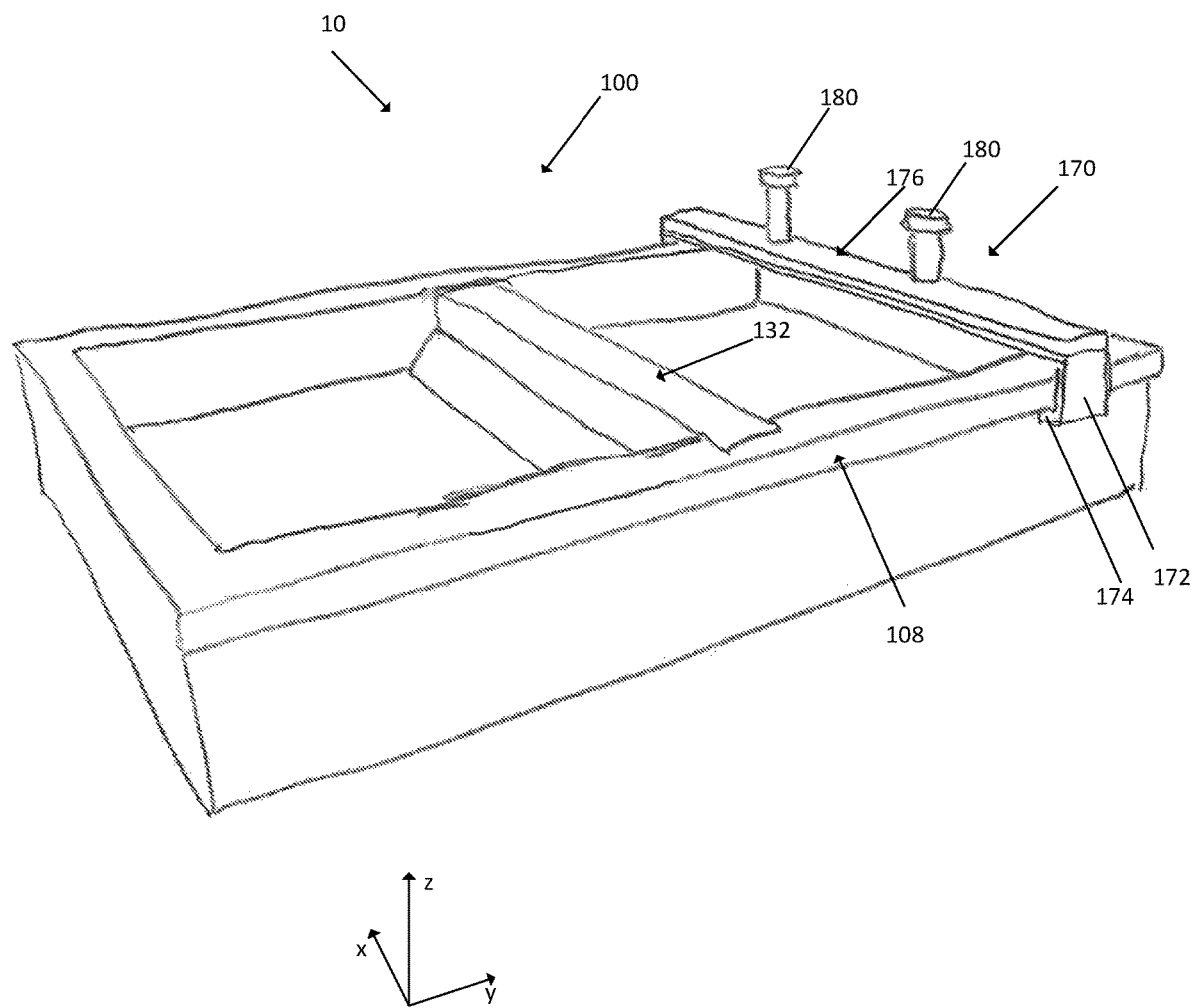
Figure 11:
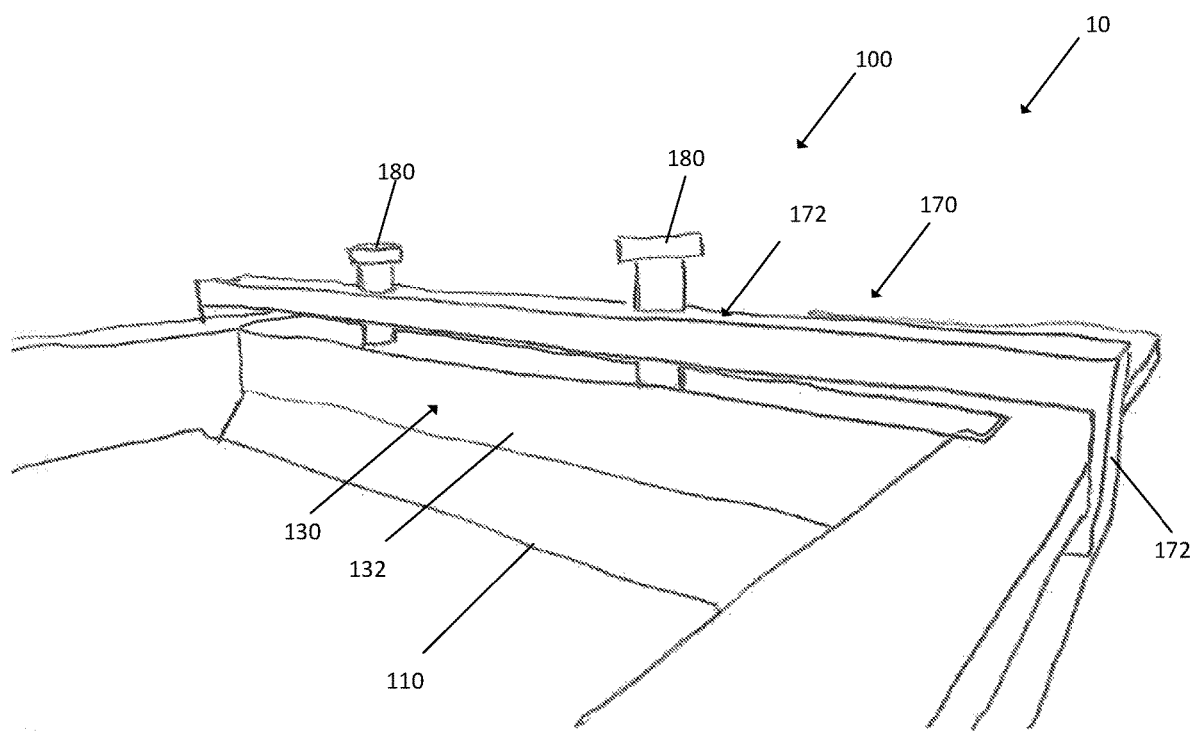
Figure 12:
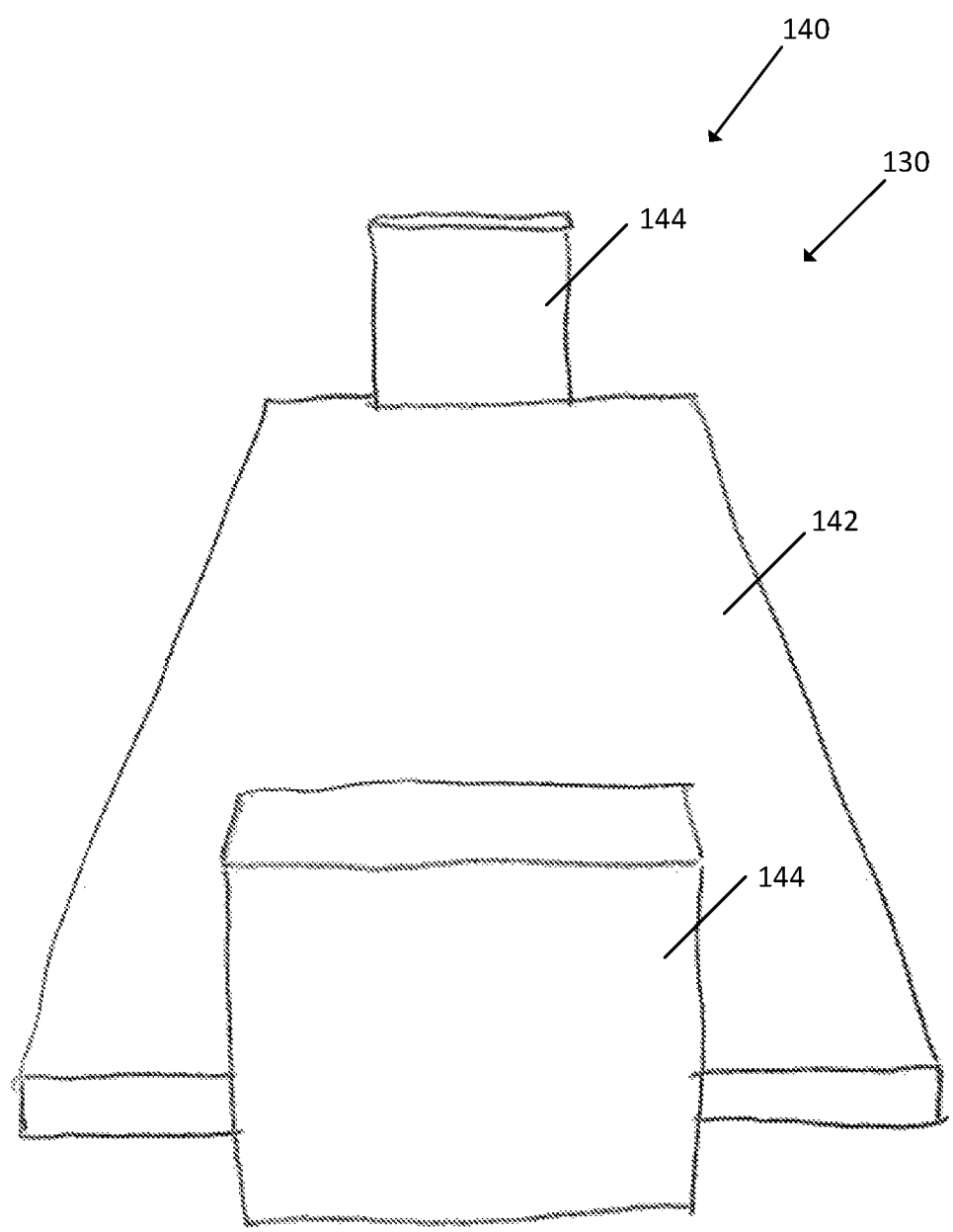
Figure 13:
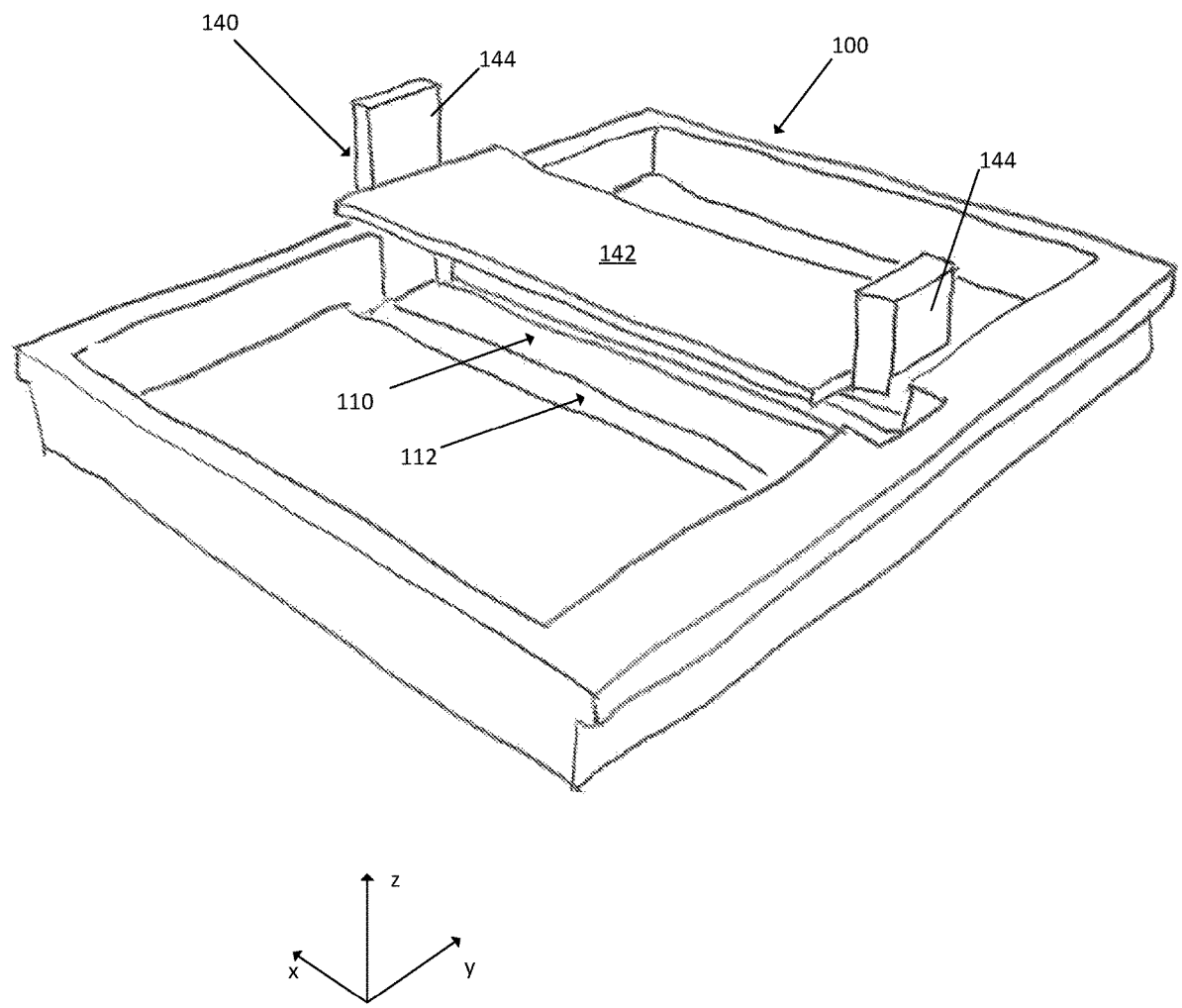

Having thus described the invention in general terms, reference will now be made to the accompanying drawings, which are not necessarily drawn to scale, and wherein:

FIG. 1 schematically depicts a perspective view of a baking pan of a baking pan assembly according to one or more embodiments shown and described herein;

FIG. 2 schematically depicts another perspective view of the baking pan of FIG. 1 according to one or more embodiments shown and described herein;

FIG. 3 schematically depicts an insert of the baking pan assembly according to one or more embodiments shown and described herein;

FIG. 4 schematically depicts another insert of the baking pan assembly according to one or more embodiments shown and described herein;

FIG. 5 schematically depicts the baking pan of FIG. 1 with the insert of FIG. 3 according to one or more embodiments shown and described herein;

FIG. 6 schematically depicts another baking pan of a baking pan assembly according to one or more embodiments shown and described herein;

FIG. 7 schematically depicts another view of the baking pan of FIG. 6 according to one or more embodiments shown and described herein;

FIG. 8 schematically depicts another insert of the baking pan assembly of FIG. 6 according to one or more embodiments shown and described herein;

FIG. 9 schematically depicts the insert of FIG. 8 and the baking pan of FIG. 6 according to one or more embodiments shown and described herein;

FIG. 10 schematically depicts a clamp assembly and the baking pan of FIG. 6 according to one or more embodiments shown and described herein;

FIG. 11 schematically depicts another view of the clamp assembly of FIG. 10 according to one or more embodiments shown and described herein;

FIG. 12 schematically depicts another insert of the baking pan assembly according to one or more embodiments shown and described herein; and FIG. 13 schematically depicts the insert of FIG. 12 and the baking pan of FIG. 6 according to one or more embodiments shown and described herein.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Still further, to facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein, the vertical direction refers to the upward-downward direction of components of the baking pan assembly (i.e., the +/−z-direction as depicted). The longitudinal direction refers to the frontward-rearward direction of components of the baking pan assembly (i.e., in the +/−y-direction as depicted) and is transverse to the vertical direction. The lateral direction refers to the cross-ways direction of components of the baking pan assembly (i.e., the +/−x-direction as depicted) and is transverse to the vertical direction and the longitudinal direction.

Various embodiments of partitioned baking pans are described herein. Baking pans assemblies generally include a baking pan having a bottom and a pair of side walls and end walls that extend upward from the bottom. The baking pan assembly further includes interchangeable inserts that may be selectively positioned within the baking pan. Some inserts define a partition that may divide the baking pan into different sections, each having an area that is smaller than the overall baking pan. Other inserts fill in various features of the baking pan, such that the entire baking pan may be used to prepare food. By having interchangeable inserts, the baking pan assembly may be easily configured to prepare different types and quantities of food, without requiring the use of multiple baking pans.

Referring initially to FIG. 1, a baking pan assembly 10 is schematically depicted. The baking pan assembly 10 includes a baking pan 100 that defines a bottom 106, a pair of opposing side walls 104 that extend upward from the bottom 106 in the vertical direction, and a pair of end walls 102 that extend upward from the bottom 106 in the vertical direction, and the end walls 102 and the side walls 104 are positioned adjacent to one another. The side walls 104 and the end walls 102 generally extend around a perimeter of the baking pan 100 and at least partially enclose the baking pan 100 in the lateral and the longitudinal directions. In the embodiment depicted in FIG. 1, the baking pan 100 has a generally rectangular shape bounded by the end walls 102 and the side walls 104. However, it should be understood that the baking pan 100 may include any suitable shape, for example, a square shape, an oval shape, a circular shape, or the like.

The baking pan 100 further defines a pair of engagement portions 120 positioned along the side walls 104, and the baking pan 100 defines a medial trench 110 that extends across the baking pan 100's bottom 106 in the lateral direction. The engagement portions 120 extend outward from the side walls 104 in the lateral direction, and each of the engagement portions 120 define a retaining slot 122 extending downward in the vertical direction. Each of the retaining slots 122 are generally bounded by the engagement portion 120 in the in the longitudinal direction, and each retaining slot 122 defines an upper opening 121 facing upward in the vertical direction and a side opening 123 facing inward into the baking pan 100 in the lateral direction. Each of the engagement portions 120 further include a side wall 125 that bounds the retaining slots 122 in the lateral direction, such that the retaining slots 122 are accessible only through the upper opening 121 and the side opening 123. In the embodiment depicted in FIG. 1, each of the engagement portions 120 include an arcuate shape at the bottom of the engagement portions 120. However, it should be understood that the bottom of the engagement portions 120 may include any suitable shape, such as a rectangular shape, or the like.

The medial trench 110 extends at least partially into the bottom 106 of the baking pan 100 in the vertical direction and is aligned with the retaining slots 122 of the engagement portions 120 in the longitudinal direction. The retaining slots 122 and the medial trench 110 are configured to receive an insert, as will be described in greater detail herein. In embodiments, the baking pan 100 may be made of any suitable material, such as aluminum, steel, cast iron, glass, a composite, or the like, and may include any one of various non-stick coatings that may assist in preventing food from sticking to the baking pan 100.

Referring to FIG. 2, another view of the baking pan 100 is schematically depicted. In embodiments, the baking pan 100 may optionally include a pair of retaining clamps 150 positioned on the engagement portions 120. Each of the retaining clamps 150 are pivotally coupled to the engagement portions 120 at a hinge 154 and the retaining clamps 150 include a hasp 152 that is configured to extend over the upper opening 121 of the retaining slot 122. The retaining clamps 150 are repositionable between an open position, in which the retaining slots 122 are accessible through the upper opening 121 positioned at the top of the retaining slot 122, and a closed position, in which the hasp 152 extends over the upper opening 121 of the retaining slot 122. Each of the retaining clamps 150 may be selectively coupled to the engagement portion 120 at a latch 150 that may selectively secure the retaining clamps 150 in the closed position.

Referring collectively to FIGS. 3 and 5, an insert 130 of the baking pan assembly 10 is schematically depicted. In the embodiment depicted in FIG. 3, the insert 130 defines a partition 132 that is configured to be inserted within and to be removable from the medial trench 110 and the engagement portions 120 of the baking pan 100. When installed to the baking pan 100, the partition 132 divides the baking pan 100 in the longitudinal direction into a first section 190 and a second section 192. The first section 190 is bounded by the side walls 104, one of the end walls 102, and the partition 132, and the first section 190 defines an area that is less than an overall area of the baking pan 100. Similarly, the second section 192 is bounded by the side walls 104, one of the end walls 102, and the partition 132, and the second section 192 defines an area that is less than the overall area of the baking pan 100. With the partition 132 dividing the baking pan 100 into the first section 190 and the second section 192, the baking pan 100 is configured to accommodate food in the first section 190 and/or the second section 192, and may be suitable for holding, cooking, and/or heating types and quantities of food that do not require use of the entire baking pan 100. For example, when cooking some smaller servings of food, it may be desirable to cook the food in a baking pan having a relatively small area, such as the first section 190 and/or the second section 192 of the baking pan 100. In the embodiment depicted in FIG. 5, the medial trench 110 is positioned at a midpoint of the baking pan 100 in the longitudinal direction, such that the partition 132 bisects the baking pan 100 and the area defined by the first section 190 is generally the same as the area defined by the second section 192. However, it should be understood that the medial trench 110 (and accordingly the partition 132) may be positioned at any suitable position of the baking pan 100 in the longitudinal direction. For example, in some embodiments, the medial trench 110 may be positioned closer to one of the end walls 102 as compared to the opposing end wall 102, such that one of the areas defined by the first section 190 or the second section 192 is greater than the other.

In embodiments, the partition 132 is positioned within the retaining slots 122 of the engagement portions 120 when the partition 132 is installed to the baking pan 100. The engagement portions 120 contact and engage the partition 132 when the partition 132 is installed to the baking pan 100, and the engagement portions 120 restrict movement of the partition 132 in the lateral direction and the longitudinal direction. In this way, the engagement portions 120 may restrict movement of the partition 132 with respect to the baking pan 100, and may assist in retaining the partition 132 within the medial trench 110 of the baking pan. In embodiments including the retaining clamp 150, the partition 132 may be selectively retained within the engagement portions 120 by the retaining clamp 150, which may prevent the partition 132 from moving with respect to the baking pan 100 in the vertical direction.

For example when the baking pan 100 is placed inside an oven or other heating source, the baking pan 100 may be heated and undergo thermal expansion, which may affect the dimensions of the medial trench 110 and/or the engagement portions 120 of the baking pan 100. As the baking pan 100 undergoes thermal expansion, dimensional changes of the medial trench 100 and/or the engagement portions 120 may cause the partition 132 to move with respect to the baking pan 100. By restricting movement of the partition 132 in the vertical direction, the retaining clamps 150 may maintain the partition 132 within the medial trench 110 and the engagement portions 120 as the baking pan 100 expands.

Referring collectively to FIGS. 2 and 4, another insert 130 of the baking pan assembly 10 is schematically depicted. In the embodiment depicted in FIGS. 2 and 4, the insert 130 defines a filler insert 140 including a bottom portion 142 and a pair of engagement portions 144 that extend upward from the bottom portion 142. The filler insert 140 is configured to be inserted within and is removable from the medial trench 110 of the baking pan 100. As shown in FIG. 2, the bottom portion 142 of the filler insert 140 is configured to be inserted within the medial trench 110, while the engagement portions 144 of the filler insert 140 are configured to be inserted within the retaining slots 122 of the engagement portions 120. The bottom portion 142 of the filler insert 140 may be aligned with the bottom 106 of the baking pan 100 such that the bottom portion 142 is aligned with an upward-facing surface of the bottom 106 of the baking pan 100 in the vertical direction. The engagement portions 144 of the filler insert 140 may be aligned with the side walls 104 of the baking pan 100 such that the engagement portions 144 are aligned with inward-facing surfaces of the side walls 104 of the baking pan 100 in the lateral direction. In this way, the filler insert 140 may fill in the medial trench 110 and the retaining slots 122 such that the baking pan 100 has an overall area bounded by the side walls 104 and the end walls 102. By filling the medial trench 110 and the retaining slots 122, the filler insert 140 may configure the baking pan 100 for holding, cooking, and/or heating types and quantities of food in which it is desirable to use the entire baking pan 100.

In embodiments including the retaining clamp 150, the filler insert 140 may be selectively retained within the engagement portions 120 by the retaining clamp 150, which may prevent the filler insert 140 from moving with respect to the baking pan 100 in the vertical direction. As described above, when the baking pan 100 is placed inside an oven or other heating source, the baking pan 100 may be heated and undergo thermal expansion, which may affect the dimensions of the medial trench 110 and/or the engagement portions 120 of the baking pan 100. As the baking pan 100 undergoes thermal expansion, dimensional changes of the medial trench 100 and/or the engagement portions 120 may cause the filler insert 140 to move with respect to the baking pan 100. By restricting movement of the filler insert 140 in the vertical direction, the retaining clamps 150 may maintain filler insert 140 within the medial trench 110 and the engagement portions 120 as the baking pan 100 expands.

In embodiments, the filler insert 140 and the partition 132 (FIG. 3) are formed from the same material as the baking pan 100. By forming the filler insert 140 and the partition 132 of the same material as the baking pan 100, the filler insert 140 and the partition 132 may experience similar thermal expansion as the baking pan 100 when exposed to a heating source, such that a dimensional relationship between the filler insert 140 and the partition with the baking pan 100 remains relatively constant. In other embodiments, the filler insert 140 and/or the partition 132 (FIG. 3) may be formed from different materials than the baking pan 100. In embodiments in which the filler insert 140 and/or the partition 132 (FIG. 3) is formed from a different material or different materials than the baking pan 100, the filler insert 140 and/or the partition 132 (FIG. 3) may be formed from materials having a similar coefficient of thermal expansion as the baking pan 100.

Referring collectively to FIGS. 6 and 7, another embodiment of the baking pan 100 is schematically depicted. The baking pan 100 includes the bottom 106, the side walls 104 and the end walls 102 extending upward from the bottom 106, and the medial trench 110. However, in the embodiment depicted in FIG. 6, baking pan 100 further defines a pair of recessed ledges 112 positioned on opposite sides of the medial trench 110. In embodiments, the recessed ledges 112 are positioned below the bottom 106 of the baking pan 100 but above the medial trench 110. Each of the side walls 104 of the baking pan 100 also define an engagement lip 108 that extends outward from the side walls 104 in the lateral direction.

Referring to FIGS. 8 and 9, another embodiment of a partition 132 is schematically depicted. The partition 132 includes a pair of wedges 136 that extend outward from lateral sides 134 of the partition 132 in the lateral direction. The wedges 136 are configured to engage the recessed ledges 112 of the baking pan 100, as will be described in greater detail herein. In the embodiment depicted in FIGS. 8 and 9, the wedges 136 have a triangular prism shape extending along a length of the partition 132, however, it should be understood that the wedges 136 may have any suitable shape to engage the recessed ledges, including, but not limited to, a rectangular prism shape, a square prism, or the like.

Referring to FIG. 10, a view of the partition 132 installed to the baking pan 100 and a clamp assembly 170 of the baking pan assembly 10 is schematically depicted. The clamp assembly 170 includes an engagement portion 172 including a tab 174, a cross-member 176 that extends in the lateral direction, and at least one retention member 180 that extends through the cross-member 176 in the vertical direction. When installed to the baking pan 100, the tab 174 is configured to engage the baking pan 100's engagement lip 108, such that the clamp assembly 170 is movable along the baking pan 100 in the longitudinal direction, but movement of the clamp assembly 170 with respect to the baking pan 100 in the vertical and lateral directions is restricted.

Referring to FIG. 11, another view of the clamp assembly 170 is schematically depicted. The clamp assembly 170 is configured to engage and is removable from the partition 132. In particular, the at least one retention member 180 is movable with respect to the cross-member 176 in the vertical direction. For example, the at least one retention member 180 may include a mechanical fastener, such as a screw, that is positioned within a threaded hole of the cross member 176. In such embodiments, the at least one retention member 180 may be selectively be moved upward and downward in the vertical direction with respect to the cross-member 176. By moving the at least one retention member 180 downward with respect to the cross member 176, the at least one retention member 180 may be selectively engaged with the partition 132 to retain the partition 132 within the medial trench 110. While the embodiment depicted in FIG. 11 shows a clamp assembly 170 including two retention members 180, it should be understood that the clamp assembly 170 may include any suitable number of retention members 180 to engage the partition 132

The clamp assembly 170 is movable along the engagement lip 108 of the baking pan 100 such that the clamp assembly 170 may be moved over the partition 132 in the vertical direction. Once positioned over the partition 132, the at least one retention member 180 may be moved from a disengaged position, in which the at least one retention member 180 is spaced apart from the partition 132 in the vertical direction, into an engaged position, in which the at least one retention member 180 contacts and engages the partition 132. By contacting and engaging the partition 132, the at least one retention member 180, and accordingly the clamp assembly 170 may assist in maintaining the partition within the medial trench 110. For example, when the baking pan 100 is placed inside an oven or other heating source, the baking pan 100 may be heated and undergo thermal expansion, which may affect the dimensions of the medial trench 110 and/or the engagement portions 120 of the baking pan 100. As the baking pan 100 undergoes thermal expansion, dimensional changes of the medial trench 100 and/or the engagement portions 120 may cause the partition 132 to move with respect to the baking pan 100. By engaging the partition 132, the clamp assembly 170 may restrict movement of the partition 132 with respect to the baking pan 100.

Referring collectively to FIGS. 12 and 13, another insert 130 of the baking pan assembly 10 is schematically depicted. In the embodiment depicted in FIGS. 12 and 13, the insert 130 defines a filler insert 140 including a bottom portion 142 and a pair of engagement portions 144 that extend upward from the bottom portion 142. The filler insert 140 is configured to be inserted within and is removable from the medial trench 110 and the recessed ledges 112 of the baking pan 100. As shown in FIG. 13, the bottom portion 142 of the filler insert 140 is configured to be inserted within the medial trench 110, while the engagement portions 144 of the filler insert 140 are configured to be inserted within the retaining slots 122 of the engagement portions 120.

The bottom portion 142 of the filler insert 140 may be aligned with the bottom 106 of the baking pan 100 such that the bottom portion 142 is aligned with the upward-facing surface of the bottom 106 of the baking pan 100 in the vertical direction. The engagement portions 144 of the filler insert 140 may be aligned with the side walls 104 of the baking pan 100 such that the engagement portions 144 are aligned with the inward-facing surfaces of the side walls 104 of the baking pan 100 in the lateral direction. In this way, the filler insert 140 may fill in the medial trench 110 and the retaining slots 122 such that the baking pan 100 has an overall area bounded by the side walls 104 and the end walls 102. By filling the medial trench 110 and the retaining slots 122, the filler insert 140 may configure the baking pan 100 for holding, cooking, and/or heating types and quantities of food in which it is desirable to use the entire baking pan 100.

It should now be understood that baking pan assemblies of the present disclosure include a baking pan having a bottom and a pair of side walls and end walls that extend upward from the bottom. The baking pan assembly further includes interchangeable inserts that may be selectively positioned within the baking pan. Some inserts define a partition that may divide the baking pan into different sections, each having an area that is smaller than the overall baking pan. Other inserts fill in various features of the baking pan, such that the entire baking pan may be used to prepare food. By having interchangeable inserts, the baking pan assembly may be easily configured to prepare different types and quantities of food, without requiring the use of multiple baking pans. Furthermore, the baking pan assemblies include various components, such as retaining clamps and clamp assemblies that may restrict movement of the insert with respect to the baking pan as the baking pan and the insert are exposed to a heat source.

The invention is not limited to the above-described embodiments and many modifications are possible within the scope of the following claims. Indeed, a person of ordinary skill in the art would be able to use the information contained in the preceding text to modify various embodiments of the invention in ways that are not literally described, but are nevertheless encompassed by the attached claims, for they accomplish substantially the same functions to reach substantially the same results. Therefore, it is to be understood that the invention is not limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A baking pan assembly comprising:
   a baking pan comprising:
      a bottom;
      a pair of opposing end walls extending upward from the bottom in a vertical direction;
      a pair of opposing side walls extending upward from the bottom in the vertical direction, wherein each of the opposing side walls define an engagement portion having a retaining slot extending downward into the engagement portions; and
   an insert configured to be inserted within the retaining slots of the baking pan; and
      retaining clamps coupled to the engagement portions;
      wherein the retaining clamps are repositionable between a closed position, in which each of the retaining clamps extend over an upper opening of the engagement portions, and an open position, in which the retaining slots of the engagement portions are accessible through the upper opening.

2. The baking pan assembly of claim 1, wherein the insert comprises a partition that, when inserted within the retaining slots, divides the baking pan into a first section and a second section.

3. The baking pan assembly of claim 2, wherein the partition comprises a lateral side and a wedge extending outward from the lateral side.

4. The baking pan assembly of claim 1, wherein the bottom of the baking pan defines a medial trench extending downward into the baking pan and extending across the baking pan in a lateral direction that is transverse to the vertical direction.

5. The baking pan assembly of claim 4, wherein the medial trench bisects the baking pan in a longitudinal direction that is transverse to the lateral direction.

6. The baking pan assembly of claim 4, wherein the insert comprises a filler insert that is configured to fill the medial trench and the retaining slots of the engagement portions.

7. The baking pan assembly of claim 6, wherein the filler insert, when inserted within the engagement portions, is aligned with inward-facing surfaces of the side walls in the lateral direction.

8. The baking pan assembly of claim 1, wherein each of the retaining clamps are hingedly coupled to the engagement portions.

9. The baking pan assembly of claim 1, further comprising a clamp assembly selectively engaged with the baking pan, wherein the clamp assembly comprises at least one retention member that is repositionable between an engaged position, in which the at least one retention member contacts the insert, and a disengaged position, in which the at least one retention member is spaced apart from the insert.

10. The baking pan assembly of claim 9, wherein the baking pan further comprises an engagement lip extending outward from and extending along the baking pan in the longitudinal direction.

11. The baking pan assembly of claim 10, wherein the clamp assembly is configured to engage the engagement lip of the baking pan.

12. The baking pan assembly of claim 1, wherein the bottom further defines a pair of recessed ledges positioned on opposite sides of the medial trench in the longitudinal direction.

\* \* \* \* \*